(12) United States Patent
Shibahara et al.

(10) Patent No.: US 12,140,603 B2
(45) Date of Patent: Nov. 12, 2024

(54) DISPENSING DEVICE, TIP MOUNTING METHOD, AND TIP REMOVING METHOD

(71) Applicant: Hitachi High-Tech Corporation, Tokyo (JP)

(72) Inventors: Masashi Shibahara, Tokyo (JP); Nobutaka Kumazaki, Tokyo (JP); Toshiki Yamagata, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1156 days.

(21) Appl. No.: 16/962,093

(22) PCT Filed: Dec. 5, 2018

(86) PCT No.: PCT/JP2018/044647
§ 371 (c)(1),
(2) Date: Jul. 14, 2020

(87) PCT Pub. No.: WO2019/150757
PCT Pub. Date: Aug. 8, 2019

(65) Prior Publication Data
US 2020/0341022 A1 Oct. 29, 2020

(30) Foreign Application Priority Data
Feb. 5, 2018 (JP) .................................. 2018-018195

(51) Int. Cl.
*B01L 3/02* (2006.01)
*G01N 35/10* (2006.01)

(52) U.S. Cl.
CPC ... *G01N 35/1011* (2013.01); *G01N 2035/103* (2013.01)

(58) Field of Classification Search
CPC ..................................................... B01L 3/0279
See application file for complete search history.

(56) References Cited

U.S. PATENT DOCUMENTS 3,766,785 A * 10/1973 Smernoff ................. A61B 5/14
422/932
5,915,284 A * 6/1999 Meltzer ................. B01L 3/0279
73/864.17

(Continued)

FOREIGN PATENT DOCUMENTS

DE 198 45 950 C1 3/2000
JP 9-119935 A 5/1997

(Continued)

OTHER PUBLICATIONS

International Search Report (PCT/ISA/210) issued in PCT Application No. PCT/JP2018/044647 dated Mar. 12, 2019 with English translation (seven pages).

(Continued)

*Primary Examiner* — Paul S Hyun
(74) *Attorney, Agent, or Firm* — Crowell & Moring LLP

(57) ABSTRACT

Provided is a dispensing device that can dispense at a high speed and with high precision and that can be miniaturized. This dispensing device suctions a liquid sample into a disposable tip and discharges the suctioned liquid sample, the dispensing device being provided with: a piston receiving part into which a piston is inserted; a tip detachment part that detaches the disposable tip mounted on the front end of the piston receiving part by pressing down the disposable tip; and a force action part that works in tandem with the tip detachment part and moves in the direction opposite to the movement direction of the tip detachment part.

6 Claims, 10 Drawing Sheets

(56) References Cited

U.S. PATENT DOCUMENTS

| | | | |
|---|---|---|---|
| 6,199,435 B1 | 3/2001 | Wilmer et al. | |
| 2003/0074989 A1 | 4/2003 | Magnussen, Jr. et al. | |
| 2003/0147781 A1* | 8/2003 | Viot .................... | B01L 3/0279 |
| | | | 422/525 |

FOREIGN PATENT DOCUMENTS

| | | |
|---|---|---|
| JP | 2003-521703 A | 7/2003 |
| JP | 2004-24981 A | 1/2004 |
| JP | 2004-101479 A | 4/2004 |
| JP | 2004-170076 A | 6/2004 |
| JP | 2007-64706 A | 3/2007 |
| JP | 2008-26055 A | 2/2008 |
| JP | 2010-203773 A | 9/2010 |
| WO | WO 01/57490 A1 | 8/2001 |
| WO | WO 2005/009618 A1 | 2/2005 |

OTHER PUBLICATIONS

Japanese-language Written Opinion (PCT/ISA/237) issued in PCT Application No. PCT/JP2018/044647 dated Mar. 12, 2019 (six pages).
Extended European Search Report issued in European Application No. 18903450.7 dated Oct. 4, 2021 (10 pages).

* cited by examiner

FIG. 4A
FIG. 4B
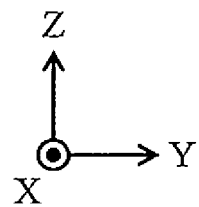
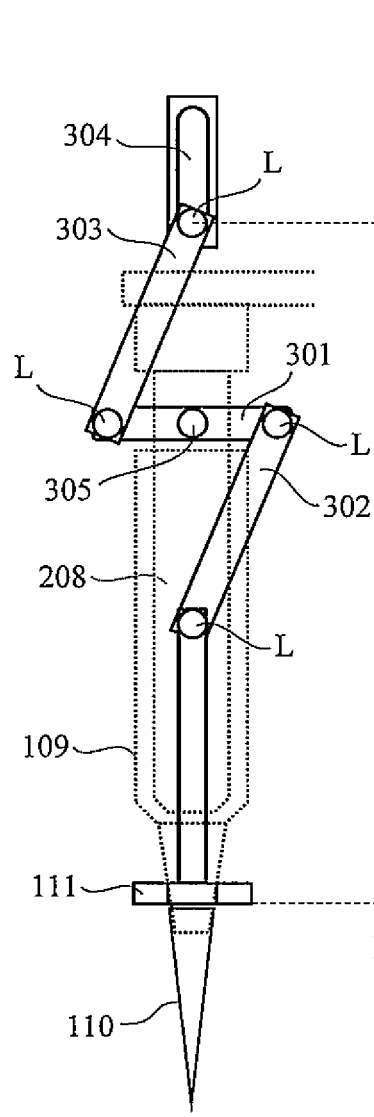
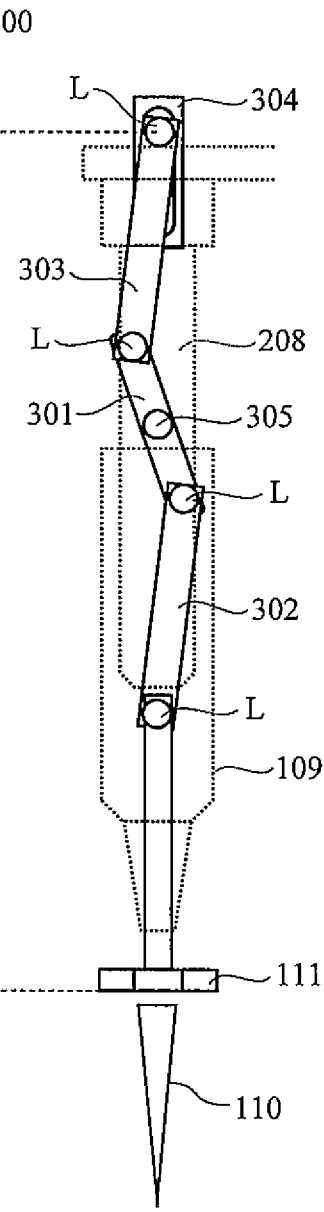

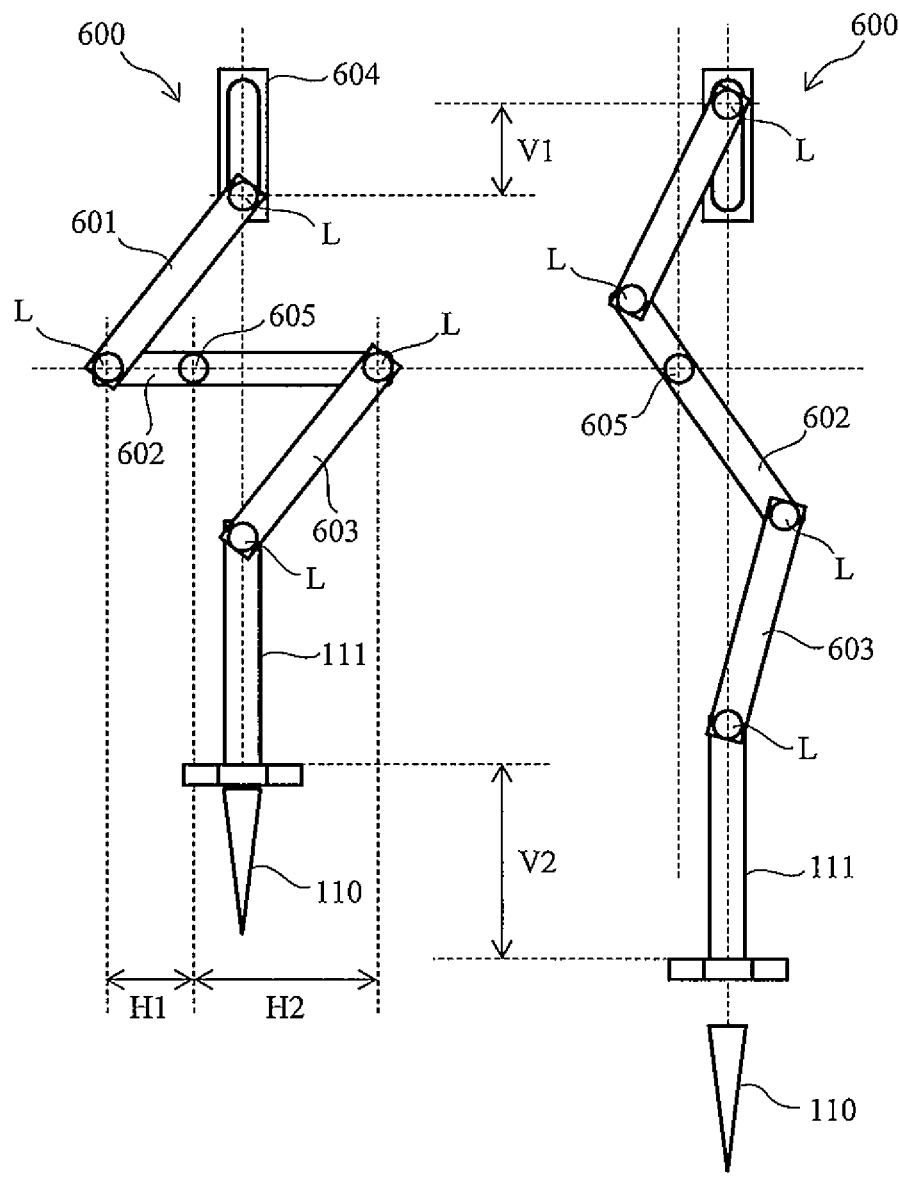

DISPENSING DEVICE, TIP MOUNTING METHOD, AND TIP REMOVING METHOD

TECHNICAL FIELD

The present disclosure relates to a dispensing device for sucking and discharging a liquid sample, a tip mounting method, and a tip removing method.

BACKGROUND ART

Conventionally, in fields such as medical and biotechnologies, a dispensing device for distributing a liquid such as a sample such as blood or a reagent into a plurality of small containers has been used. This dispensing device is configured by a tip, a pipette device for sucking and discharging a liquid sample into the tip, a carrier device for carrying the pipette device, and the like. A predetermined amount of the sample or the reagent is sucked into the tip from these storage containers by the dispensing device, and is discharged into the predetermined small container.

In this type of dispensing device, many kinds of samples and reagents are usually processed continuously, so disposable tips made of plastic are used as replaceable tips in order to prevent their mixing and contamination. The tip is detachably attached to the edge of the pipette device, and a new disposable tip is exchanged for each suction and discharge operation to perform a dispensing operation. The work of mounting and detaching the disposable tip performed by the automatic dispensing device is automated.

PTL 1 discloses a method in which a tip detachment plate having a U-shaped notch is used, as a method of detaching the disposable tip. The method is as follows. First, the pipette device on which the disposable tip is mounted is lowered to a position lower than the height of the fixed disposable tip detachment plate. Next, a nozzle is moved horizontally, and a cylindrical portion where the disposable tip is mounted is inserted into a U-shaped notch. Then, the disposable tip is detached by hooking the upper edge of the disposable tip into the U-shaped notch and raising it vertically.

Further, a pipette device disclosed in PTL 2 is equipped with a dedicated drive component (such as an air cylinder or a motor) for detaching the disposable tip. Further, PTL 3 discloses a method in which a motor for driving a piston of a pipette device is used, and one motor is used to press down a tip detaching arm to detach a disposable tip.

CITATION LIST

Patent Literature

PTL 1: JP 2007-064706 A
PTL 2: JP 2010-203773 A
PTL 3: JP 2004-170076 A

SUMMARY OF INVENTION

Technical Problem

It is important for a pneumatic dispensing device that sucks and discharges a liquid sample using decompression due to expansion of air or pressurization due to compression of air to achieve both high precision and high throughput dispensing and downsizing of the device size.

The disadvantage of the pneumatic dispensing device is that since it uses a compressible fluid, air, as a medium for sucking the liquid, if there is a large amount of medium, it is difficult to perform a high-speed and highly accurate dispensing operation due to the damping effect.

Further, when miniaturizing each unit and the dispensing device, it is important to devise a method for detaching the disposable tip. As described above, PTL 1 describes a method of hooking a nozzle tip on a plate having a U-shaped notch and detaching the nozzle tip. According to this method, a space for installing the nozzle tip in the device and a space for discarding the nozzle tip (trash box) are required, and the size of the entire device becomes large.

In the method described in PTL 2, since independent driving sources such as a motor and a solenoid are attached for detaching the disposable tip, a dispensing mechanism becomes large and complicated.

In the tip attachment/detachment method described in PTL 3, a piston drive mechanism of the pipette device and a disposable tip attachment/detachment mechanism are integrated, and the disposable tip attachment/detachment mechanism is realized with the same drive system to reduce the size, but a separate mechanism is required to press out a detaching jig. Therefore, it is necessary to include the stroke of pressing out the detaching jig in the press stroke of the piston of the pipette device, which increases the amount of pressure medium. That is, there is a problem that downsizing of the device becomes difficult to realize. As described above, a dispensing device that is capable of high-speed and highly-accurate dispensing operation without increasing the amount of air and has been downsized has not yet been realized.

The present disclosure has been made to solve the above problems, and an object of the present disclosure is to provide a dispensing device that can dispense at high speed and with high accuracy and that is downsized.

Solution to Problem

In order to solve the above problems, there is provided a dispensing device for sucking a liquid sample into a disposable tip and discharging the sucked liquid sample. The dispensing device includes a piston receiving part into which a piston is inserted, a tip detachment part that detaches the disposable tip mounted on an edge of the piston receiving part by pressing down the disposable tip, and a force action part that is in conjunction with the tip detachment part and moves in a direction opposite to a movement direction of the tip detachment part.

Further, there is provided a tip mounting method in a dispensing device. The tip mounting method includes a step of driving a first motor to press a piston into a piston receiving part, and making the force action part and the tip detachment part that move in an interlocking manner in opposite directions foldable, and a step of driving a second motor to lower an edge of the piston receiving part toward a disposable tip, and pressing up the tip detachment part to mount the disposable tip to the edge of the piston receiving part.

Furthermore, there is provided a tip removing method for detaching a disposable tip mounted on an edge of a piston receiving part included in a dispensing device. The tip removing method includes a step of driving a motor to pull out a piston from the piston receiving part, pressing up, of a force action part and a tip detachment part that move in conjunction with each other in opposite directions, the force action part by the piston to press down the tip detachment part, and pressing out and detaching the disposable tip mounted on an edge of the piston receiving part.

The present specification includes the disclosure content of Japanese Patent Application No. 2018-018195, which is the basis of priority of the present application.

Advantageous Effects of Invention

According to the present disclosure, it is possible to provide a dispensing device that can dispense at high speed and with high accuracy and is downsized. Objects, configurations, and effects besides the above description will be apparent through the explanation on the following embodiments.

BRIEF DESCRIPTION OF DRAWINGS

FIGS. 4A and 4B are diagrams illustrating an operation of detaching a disposable tip.

FIGS. 8A and 8B are diagrams for describing a dispensing device of a second embodiment.

DESCRIPTION OF EMBODIMENTS

Figure 1:
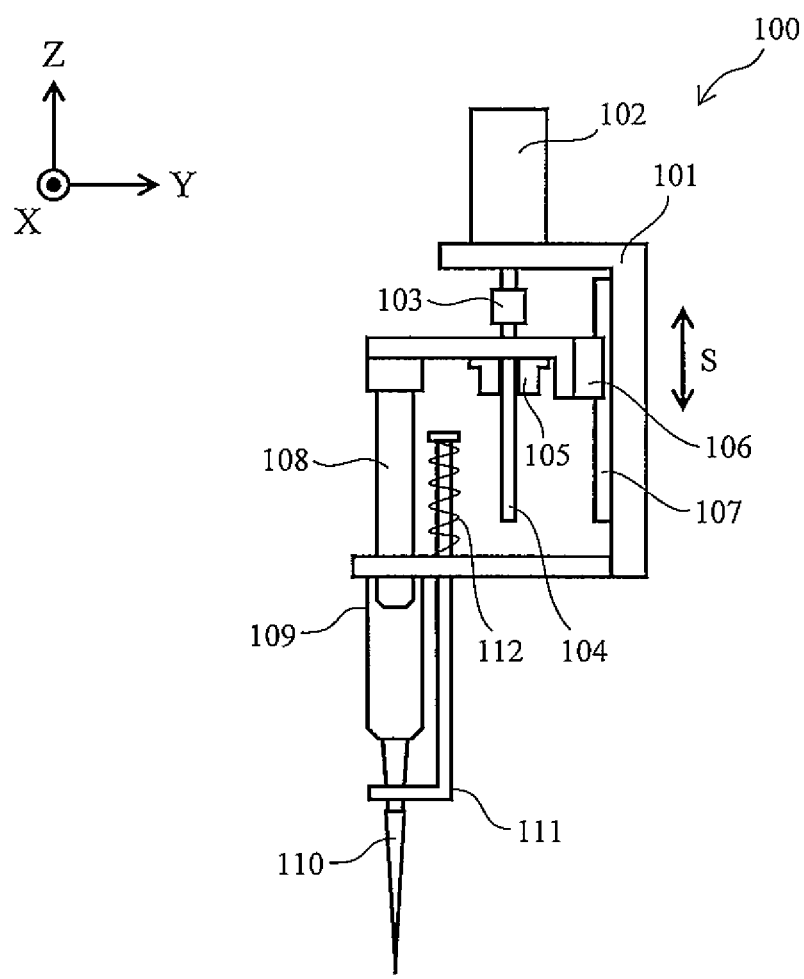
FIG. 1 is a diagram illustrating a dispensing device of a comparative example.

Hereinafter, embodiments of the present disclosure will be described on the basis of the drawings. Further, the embodiments of the present disclosure are not limited to embodiments described below, and various modifications can be made within the scope of the technical idea thereof. Further, the same reference numerals are given to the corresponding portions of the drawings used for the description of the respective embodiments described later, and the duplicated description will be omitted. First, a dispensing device of a comparative example will be described.

<Comparative Example>

FIG. 1 is a diagram illustrating a dispensing device 100 of a comparative example. The dispensing device 100 includes a base 101 having an L shape as a whole, and a motor 102 is provided in the upper portion of the base 101. The base 101 is rotatably provided with a screw shaft 104 made of a trapezoidal screw, a ball screw, or the like, which is connected to a rotating shaft of the motor 102 via a coupling 103.

The screw shaft 104 is provided with a slider 106 that passes through the screw shaft 104 and a nut 105 that is screwed onto the screw shaft 104. The slider 106 is connected to a linear guide 107 provided on the base 101, and each of the nut 105 and the slider 106 is vertically movable or slidable in the direction of arrow S illustrated in the drawing. Further, the slider 106 is joined to a piston 108 projecting downward, and is configured to move up and down without rotating.

The piston 108 and the piston receiving part 109 form a pipette mechanism, and the above-described mechanism that moves up and down functions as a pump. A disposable tip 110 is mounted on the edge of the piston receiving part 109. A tip detachment part 111 is provided above the disposable tip 110. The tip detachment part 111 is provided with a U-shaped notch, or a through hole having a diameter smaller than the diameter of the opening of the disposable tip 110. A spring material 112 such as a spring connected to the upper end of the tip detachment part 111 and the base 101 constantly biases the tip detachment part 111 upward and is configured to be vertically movable along arrow S. Further, in order to dispense into small containers installed at various places in the device, the dispensing device 100 is installed on an automatic stage (not illustrated) that is freely driven in the horizontal direction and the vertical direction.

Figure 2A:
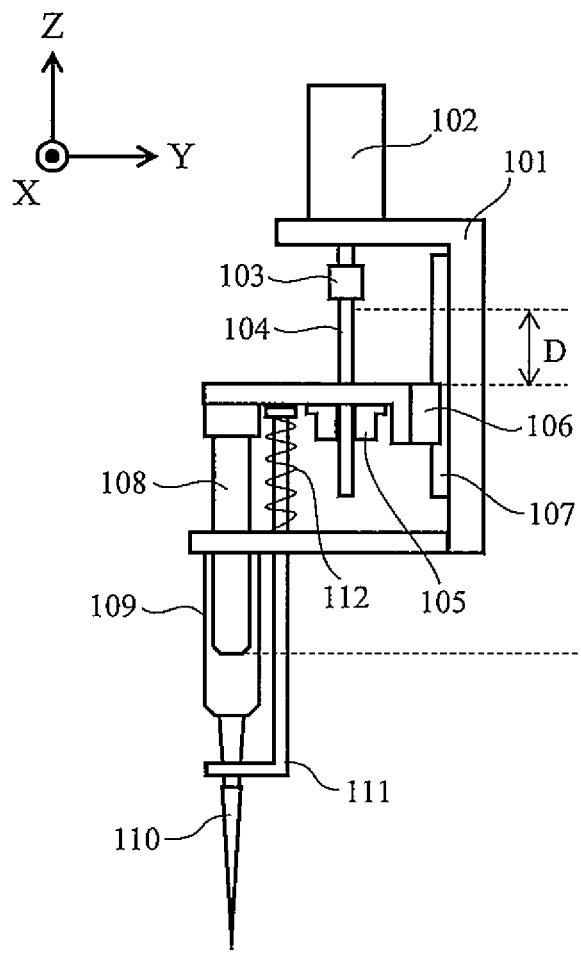
FIGS. 2A and 2B are diagrams for describing an operation of the dispensing device.

FIG. 2 is a diagram for describing the operation of the dispensing device 100. The dispensing operation by the dispensing device 100 of the comparative example and the detaching operation of the disposable tip 110 will be described with reference to FIG. 2. First, the dispensing device 100 mounts the disposable tip 110 on the edge of the piston receiving part 109. Subsequently, in the dispensing device 100, when the motor 102 is driven to rotate the screw shaft 104, the piston 108 moves up and down together with the slider 106 to decrease (or increase) the internal pressure of the piston receiving part 109, and the liquid sample is sucked to the disposable tip 110 (or discharged from the disposable tip 110). In FIG. 2(a), the range of the screw shaft 104 used for the dispensing operation is indicated by arrow D.

Figure 2B:
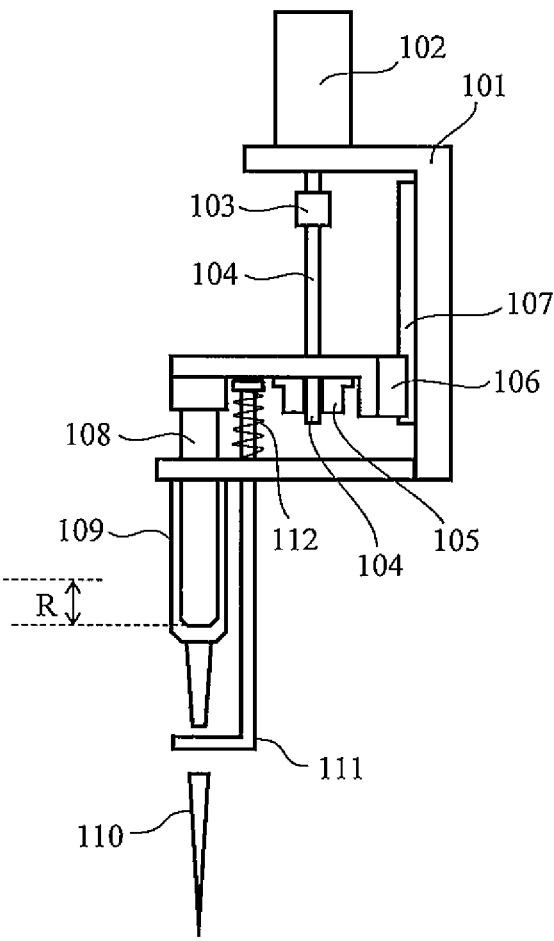

When the dispensing operation ends and the disposable tip 110 needs to be replaced, the dispensing device 100 discharges the liquid sample in the disposable tip 110, and further drives the motor 102 to rotate the screw shaft 104. By doing so, the piston 108 descends together with the slider 106, the upper end of the tip detachment part 111 and the slider 106 contact each other, and the tip detachment part 111 is pressed downward together with the spring material 112 as illustrated in FIG. 2(b). The disposable tip 110 that is mounted on the edge of the piston receiving part 109 is detached and separated from the piston receiving part 109. In FIG. 2, the range of the piston 108 used for the detaching operation of the disposable tip 110 is illustrated by arrow R.

If the amount of air in the piston receiving part 109 is large, the high-speed and highly accurate dispensing operation becomes difficult due to the damping effect of the pressure medium. In the dispensing device 100 of the comparative example, since a press stroke amount of the piston 108 for taking out the disposable tip 110 needs to be included in the press stroke amount for dispensing, the pressure medium is increased by the length of the arrow R.

First Embodiment

Figure 3:
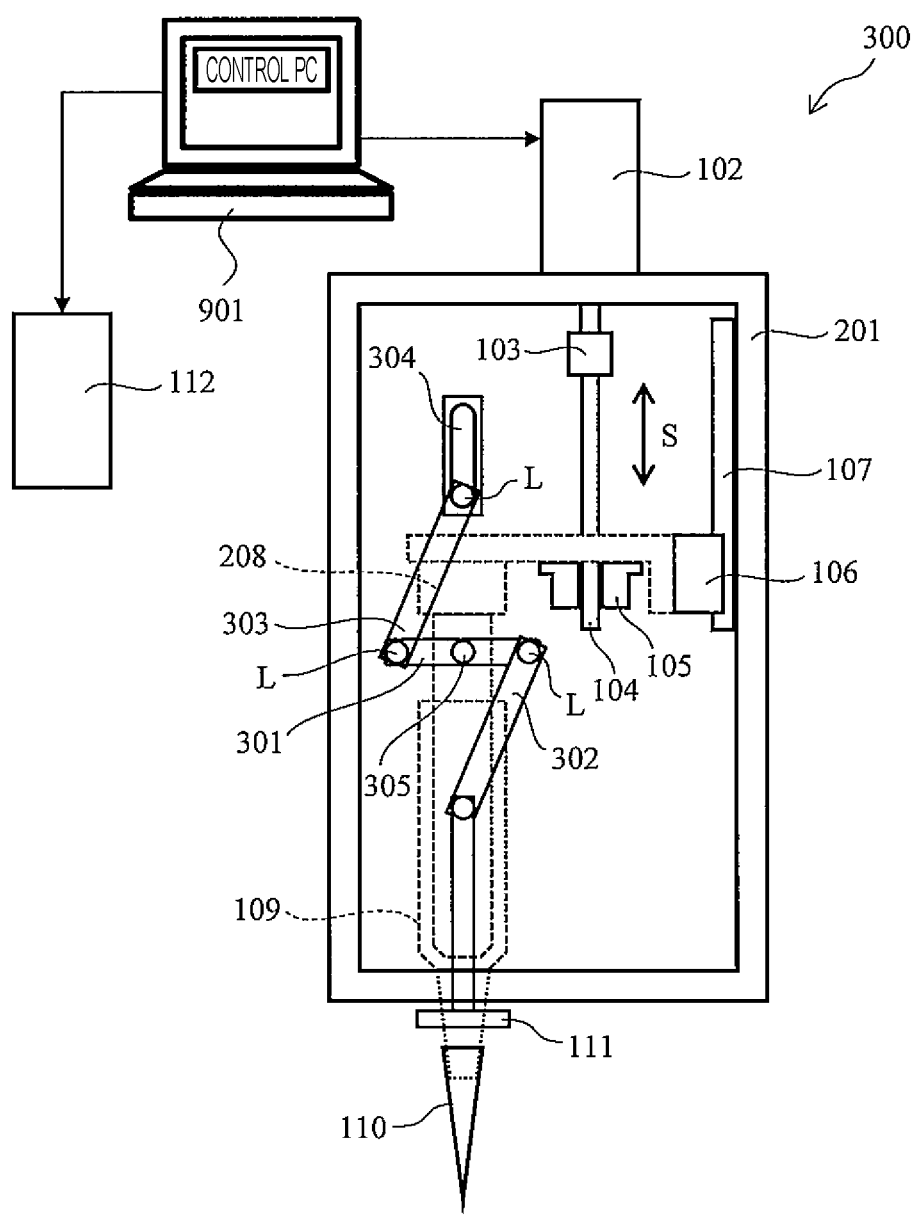
FIG. 3 is a diagram illustrating a dispensing device according to a first embodiment of the present disclosure.

FIG. 3 is a diagram illustrating a dispensing device 300 according to a first embodiment of the present disclosure. The dispensing device 300 has a base 201 having a box shape as a whole, and a motor 102 is provided in the upper portion of the base 201. The motor 102 is connected to a control PC (Personal Computer) 901 and controlled by a control signal. The base 201 is rotatably provided with a screw shaft 104 made of a trapezoidal screw, a ball screw, or the like, which is connected to a rotating shaft of the motor 102 via a coupling 103.

The screw shaft 104 is provided with a nut 105 and a slider 106 that are screwed together. The slider 106 is connected to the linear guide 107 provided on the base 201, and each of the nut 105 and the slider 106 is vertically movable or slidable in the direction of arrow S illustrated in the drawing. Further, the slider 106 is joined to a piston 208 (dotted line) protruding downward, and is configured to move up and down without rotating.

The piston 208 and the piston receiving part 109 (dotted line) form a pipette mechanism, and the mechanism that moves up and down serves as a pump. A disposable tip 110 is mounted on the edge of the piston receiving part 109. A tip detachment part 111 is provided above the disposable tip 110. The tip detachment part 111 is provided with a U-shaped notch or a through hole having a diameter smaller than the diameter of the opening of the disposable tip 110, and is configured to be vertically movable along arrow S. The disposable tip 110 is pressed out and detached when the tip detachment part 111 descends. Further, in order to dispense into small containers installed at various places in the device, the dispensing device 300 is installed on an automatic stage (not illustrated) that is freely driven in the horizontal direction and the vertical direction.

A rod 301 is connected to the piston 208 by a link, a pin, or the like to be rotatable with respect to the piston 208, and other rods 302 and 303 are rotatably connected to the rod 301 at both ends of the rod 301. Therefore, a structure formed by the rods 301 to 303 can be stretched or folded. A link L provided at the end of the rod 303 can move along a guide rail 304 provided on the base 201, and as a result, the rod 302 can be pressed down by lifting up the rod 303 as illustrated in FIG. 3. That is, the rod 303 functions as a force action part for pressing down the tip detachment part 111, and the tip detachment part 111 and the force action part form a structure having a rotating shaft. The dispensing device 300 of the present disclosure can use this mechanism to press down the tip detachment part 111 to detach the disposable tip 110.

The dispensing operation of the dispensing device 300 and the detaching operation of the disposable tip 110 of the first embodiment will be described below. The dispensing device 300 first mounts the disposable tip 110 to the edge of the piston receiving part 109 by lowering the automatic stage. Subsequently, the motor 102 is driven by the control of the control PC 901, and the piston 208 (dotted line) is moved up and down together with the slider 106 to decrease (or increase) the internal pressure of the piston receiving part 109 (dotted line), and the liquid sample is sucked to the disposable tip 110 (or discharged from the disposable tip 110).

The dispensing device 300 of the first embodiment does not have a structure in which the piston 208 is pressed downward in order to detach the disposable tip 110. That is, it is not necessary to secure a space in which the piston 208 can be stroked in order to detach the disposable tip 110. Therefore, when the above dispensing operation is executed, the piston 208 (dotted line) can vibrate at a position (near the innermost portion) below the piston receiving part 109 (dotted line). That is, the amount of the pressure medium is much smaller than that of the dispensing device 100 of the comparative example, and in principle, the amount of the pressure medium in the piston receiving part 109 can be made almost zero.

When the dispensing operation ends and the disposable tip 110 needs to be replaced, the dispensing device 300 first completely discharges the liquid sample in the disposable tip 110. Then, the control PC 901 drives the motor 102 and raises the piston 208 together with the slider 106. After the upper end of the slider 106 contacts the link L provided at the end of the rod 303, the rod 303 is pressed upward along the rail 304 as the slider 106 is pushed up. The dispensing operation is performed by vibrating the slider 106 and the piston 208 within a range in which the link L of the rod 303 and the upper end of the slider 106 do not come into contact with each other.

As described above, the rods 302 and 303 are rotatably connected to the rod 301 at both ends of the rod 301. Therefore, as the rod 303 rises, the rod 301 rotates clockwise about a rotation center 305. At the same time, the rod 302 is pressed downward as the rod 301 rotates.

The lower end of the rod 302 is rotatably mounted on the upper end of the tip detachment part 111 by the link L (or a pin) or the like, and the tip detachment part 111 is pressed downward as the rod 302 descends. As a result, the disposable tip 110 attached to the lower portion of the piston receiving part 109 is detached and separated from the piston receiving part 109.

FIG. 4 is a diagram illustrating an operation of detaching the disposable tip 110. FIG. 4a illustrates the rods 301 to 303 in a folded state, and FIG. 4b illustrates the rods 301 to 303 in a stretched state. In FIG. 4, arrow P indicates a range in which the piston 208 operates to detach the disposable tip 110, and arrow R indicates a range in which the tip detachment part 111 operates in conjunction with the rod 303. The dispensing device 300 changes from the state illustrated in FIG. 4(a) to the state illustrated in FIG. 4(b) by the above-described operation, and the disposable tip 110 is removed.

Figure 5A:
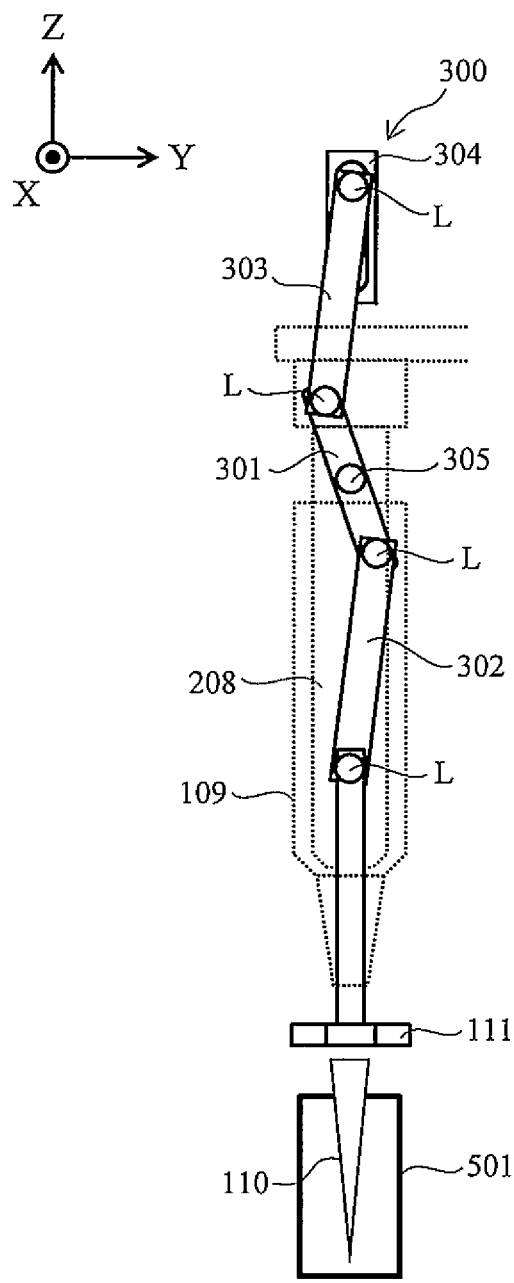
FIGS. 5A and 5B are diagrams illustrating an operation of mounting the disposable tip.
Figure 5B:
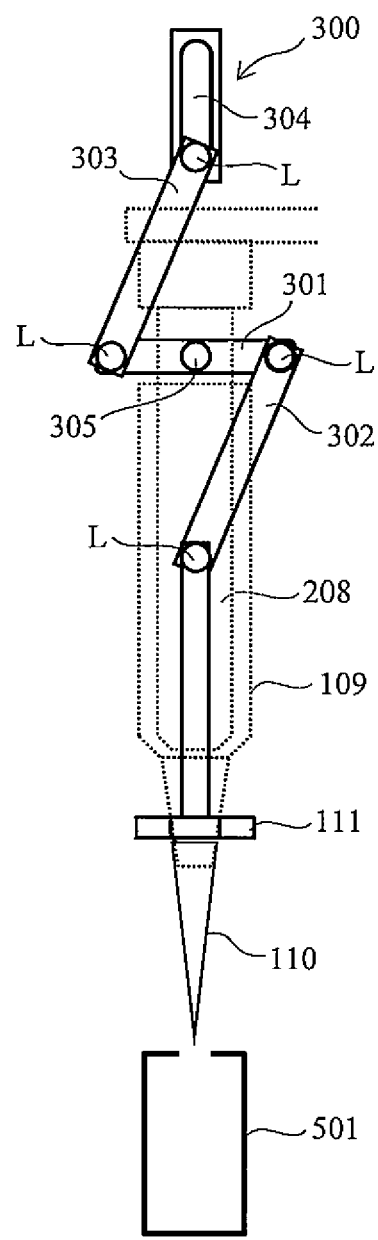

FIG. 5 is a diagram illustrating a state that the disposable tip 110 is mounted. First, the control PC 901 outputs a control signal to drive the motor 102 and lower the piston 208 together with the slider 106. In this state, the rods 301 to 303 can be folded when the tip detachment part 111 is lifted upward. Subsequently, the control PC 901 outputs a control signal to drive a motor 112 for moving the stage, and moves the dispensing device 300 to a position directly above a tip holder 501 on which the disposable tip 110 is installed. Then, under the control of the control PC 901, the dispensing device 300 is lowered, and the disposable tip 110 is mounted on the edge of the piston receiving part 109. When mounting the disposable tip 110, the tip detachment part 111 and the rod 302 are pressed up. Then, when the stage is moved to raise the dispensing device 300 right above, the state illustrated in FIG. 5(b) is obtained, and the mounting of the disposable tip 110 is completed. It is also possible to determine whether the disposable tip 110 is normally mounted on the piston receiving part 109 by using a brightness sensor or the like.

[Motor Control]

Figure 6:
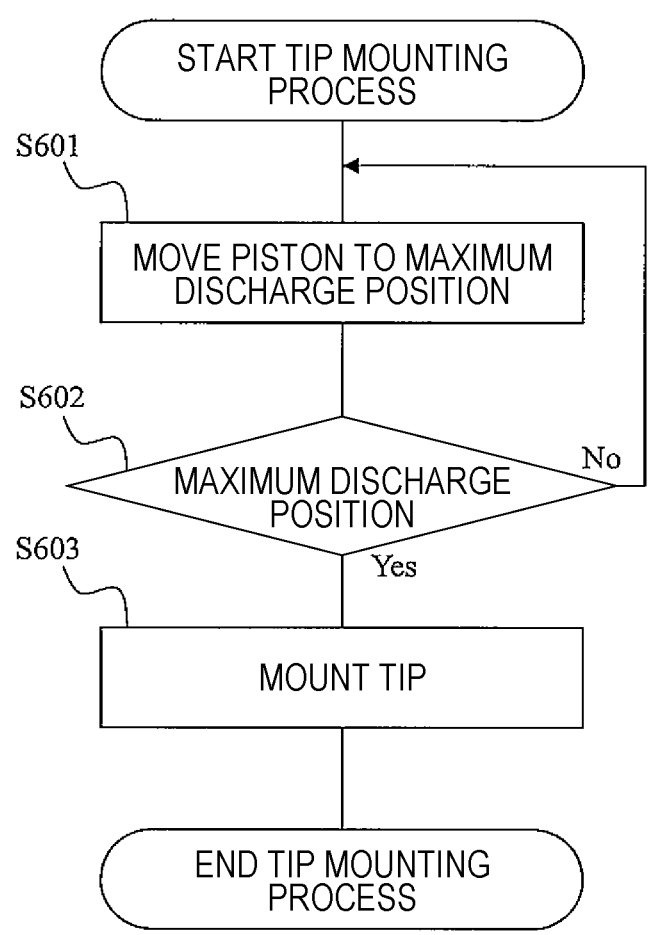
FIG. 6 is a diagram illustrating a processing flow of a control PC.

FIG. 6 is a diagram illustrating a processing flow of the control PC 901. The operations S601 to S603 when the dispensing device 300 mounts the disposable tip 110 will be described below with reference to FIG. 6.

(S601)

When the disposable tip 110 is mounted on the edge of the piston receiving part 109 included in the dispensing device 300, the control PC 901 drives the dispensing motor 102 to move the position of the piston 208 to the vicinity of the maximum discharge position. Here, the vicinity of the maximum discharge position means within a predetermined range from the position where the piston 208 is most inserted into the piston receiving part 109. When the piston 208 is near the maximum discharge position, the amount of pressure medium existing in the piston receiving part 109 can be regarded as almost zero.

(S602)

When the position of the piston 208 is at the maximum discharge position, the process proceeds to S603. When the position of the piston 208 is not at the maximum discharge position, the processing of S601 is repeated again. Whether the piston 208 is at the maximum discharge position is determined by measuring the position of the slider 106, for example.
(S603)

The control PC 901 drives the motor 112 for moving the stage and lowers the stage to mount the disposable tip 110 to the edge of the piston receiving part 109.

Figure 7:
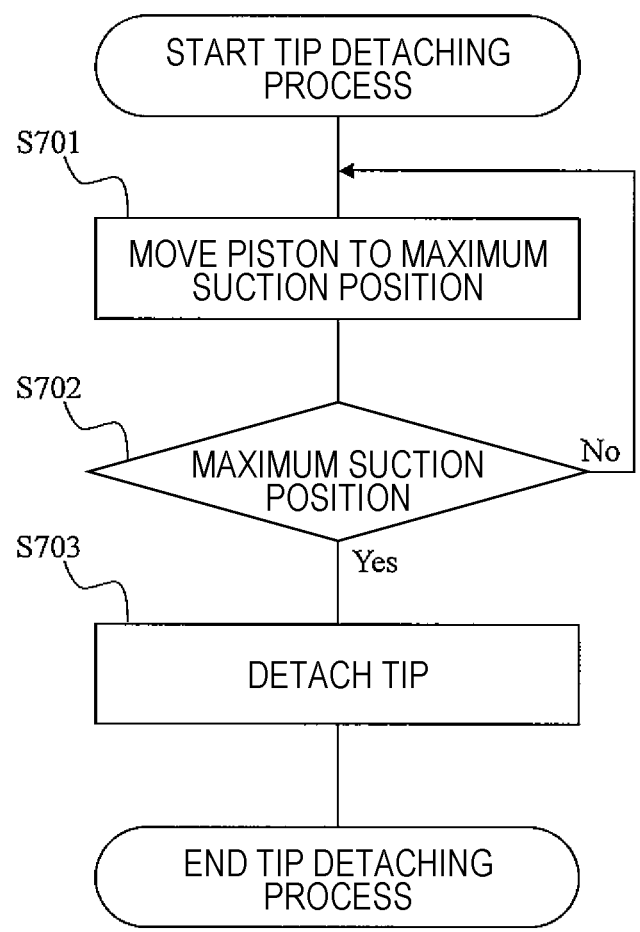
FIG. 7 is a diagram illustrating a processing flow of the control PC.

FIG. 7 is a diagram illustrating a processing flow of the control PC 901. The operations S701 to S703 when the dispensing device 300 detaches the disposable tip 110 will be described below with reference to FIG. 7.
(S701)

When the disposable tip 110 is detached from the edge of the piston receiving part 109 included in the dispensing device 300, the control PC 901 drives the dispensing motor 102 to move the position of the piston 208 to a maximum suction position. Here, the maximum suction position means a position where the piston 208 is most pulled out from the piston receiving part 109.
(S702)

When the position of the piston 208 is at the maximum suction position, the process proceeds to S703. When the position of the piston 208 is not at the maximum suction position, the process of S701 is repeated again. Whether the piston 208 is at the maximum suction position is determined by measuring the position of the slider 106, for example.
(S703)

The control PC 901 drives the dispensing motor 102 and further raises the stage to lift up the piston 208 so as to lower the tip detachment part 111, and detaches the disposable tip 110 from the edge of the receiving part 109.

As described above, in the dispensing device 300 of the present disclosure, a press stroke of the tip detachment part 111 for detaching the disposable tip 110 is included in the stroke of pulling the piston 208. Therefore, the amount of air in the piston receiving part 109 can be reduced unlike the method of detaching the disposable tip 110 by pressing the piston 208 into the piston receiving part 109. Therefore, the dispensing device 300 of the present disclosure can reduce the damping effect of the pressure medium, and can perform high-speed and highly accurate dispensing. In addition, since the dispensing device 300 includes the press stroke for detaching the disposable tip 110 in the stroke for pulling the piston 208, the dispensing operation and the detaching operation of the disposable tip 110 both can be performed using the same motor 102, and the entire device is miniaturized.

Second Embodiment

FIG. 8 is a diagram for describing a dispensing device of a second embodiment. In FIG. 8, only the component 600 for detaching the disposable tip 110 is illustrated in order to explain the differences from the first embodiment. The dispensing device of the second embodiment has the same operation principle for detaching the disposable tip 110 as the dispensing device 300 of the first embodiment, but is different from the dispensing device 300 of the first embodiment in the position of a rotation center 605 of a rod 602 rotatably connected to the piston 208.

As illustrated in FIG. 8(a), in the dispensing device of the second embodiment, the rotation center 605 of the rod 602 is provided at a position where the ratio of H1:H2 (H1<H2 in the drawing) between a distance to a connection point with the rod 601 and a distance to a connection point with the rod 603. That is, the rod 603 is configured to move largely with respect to the small movement of the rod 601. In FIG. 8, the amount of movement of the rod 601 along a guide rail 604 is indicated by V1, and the amount of downward movement of the tip detachment part 111 is indicated by V2.

When the above configuration is adopted, the tip detachment part 111 is pressed downward more than the moving amount of the rod 601, and the disposable tip 110 mounted on the lower portion of the piston receiving part 109 is detached and separated from the piston receiving part 109. At this time, the relational expression of H1:H2=V1:V2 is established. In the case of H1<H2, the moving distance of the piston 208 when the disposable tip 110 is detached can be reduced, so that the dispensing device can be downsized. In the case of H2<H1, the disposable tip 110 is detached and separated from the piston receiving part 109 with a smaller driving force by the lever principle.

Third Embodiment

Figure 9A:
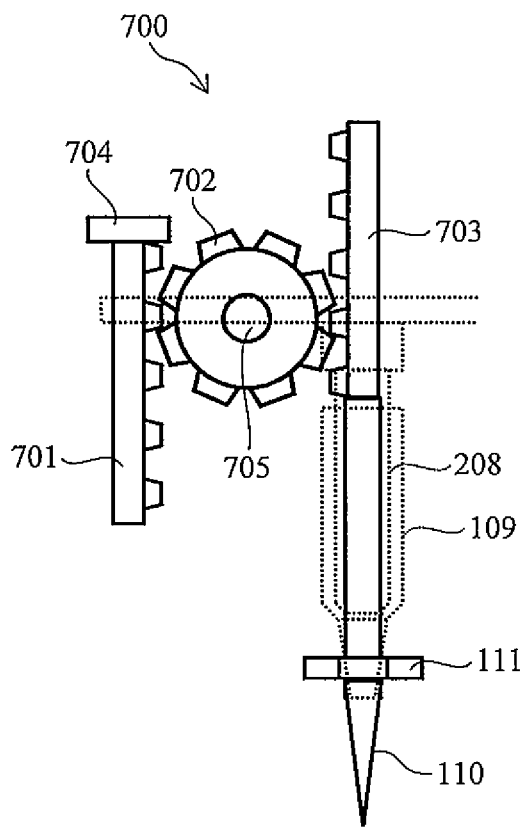
FIGS. 9A and 9B are diagrams for describing a dispensing device of a third embodiment.

FIG. 9 is a diagram for describing a dispensing device of a third embodiment. In FIG. 9, only the component (a rack pinion 700) for detaching the disposable tip 110 is illustrated in order to explain the differences from the first embodiment. In the dispensing device of the third embodiment, the rack pinion 700 including a gear 702 and racks 701 and 703 is used instead of the plurality of collapsible rods 301 to 303 to control the dispensing operation. The gear 702 has a rotation center 705 and is rotatably attached to the base 201. The gear 702 and the rack 701 have teeth meshing with each other, and the rack 701 moves up or down in conjunction with the rotation of the gear 702. Similarly, the gear 702 and the rack 703 have teeth meshing with each other, and the rack 703 moves up or down in conjunction with the rotation of the gear 702.

Figure 9B:
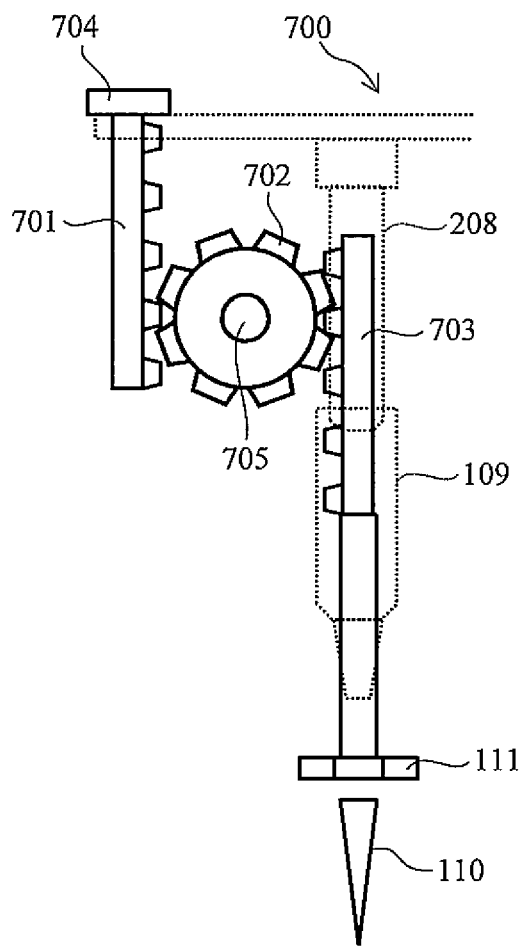

Further, when the slider 106 moves up, the rack 701 is lifted while the upper end 704 of the rack 701 contacts the slider 106 (FIG. 9(b)). The gear 702 rotates clockwise in accordance with the upward movement of the rack 701, and the rack 703 descends. The tip detachment part 111 is connected to the rack 703, and when the rack 703 descends, the disposable tip 110 is pressed out and separated from the edge of the piston receiving part 109. That is, the rack 701 functions as a force action part for pressing down the tip detachment part 111. The liquid is sucked and discharged by pushing and pulling the slider 106 and the piston 208 within a range where the slider 106 does not contact the upper end 704 of the rack 701 (FIG. 9(a)).

Therefore, the dispensing device of the third embodiment uses the same motor 102 for the dispensing application and for the detaching of the disposable tip 110, as in the dispensing device 300 of the first embodiment, so that the device can be downsized. Further, the dispensing device of the third embodiment has a specification in which the rack 703 is lowered by lifting the rack 701 upward, and the disposable tip 110 is pressed out and detached. That is, the press stroke of the tip detachment part 111 for detaching the disposable tip 110 is included in the stroke of pulling the piston 208. Therefore, the amount of air in the piston receiving part 109 can be reduced unlike the method of detaching the disposable tip 110 by pressing the piston 208 into the piston receiving part 109. Therefore, in the dispensing device of the third embodiment, the damping effect of the pressure medium is reduced, and high-speed and highly accurate dispensing can be performed. Further, the gear 702 may be realized by another member (rotating body) having a rotating shaft, and the present embodiment does not limit the shape of the rotating body.

Fourth Embodiment

Figure 10:
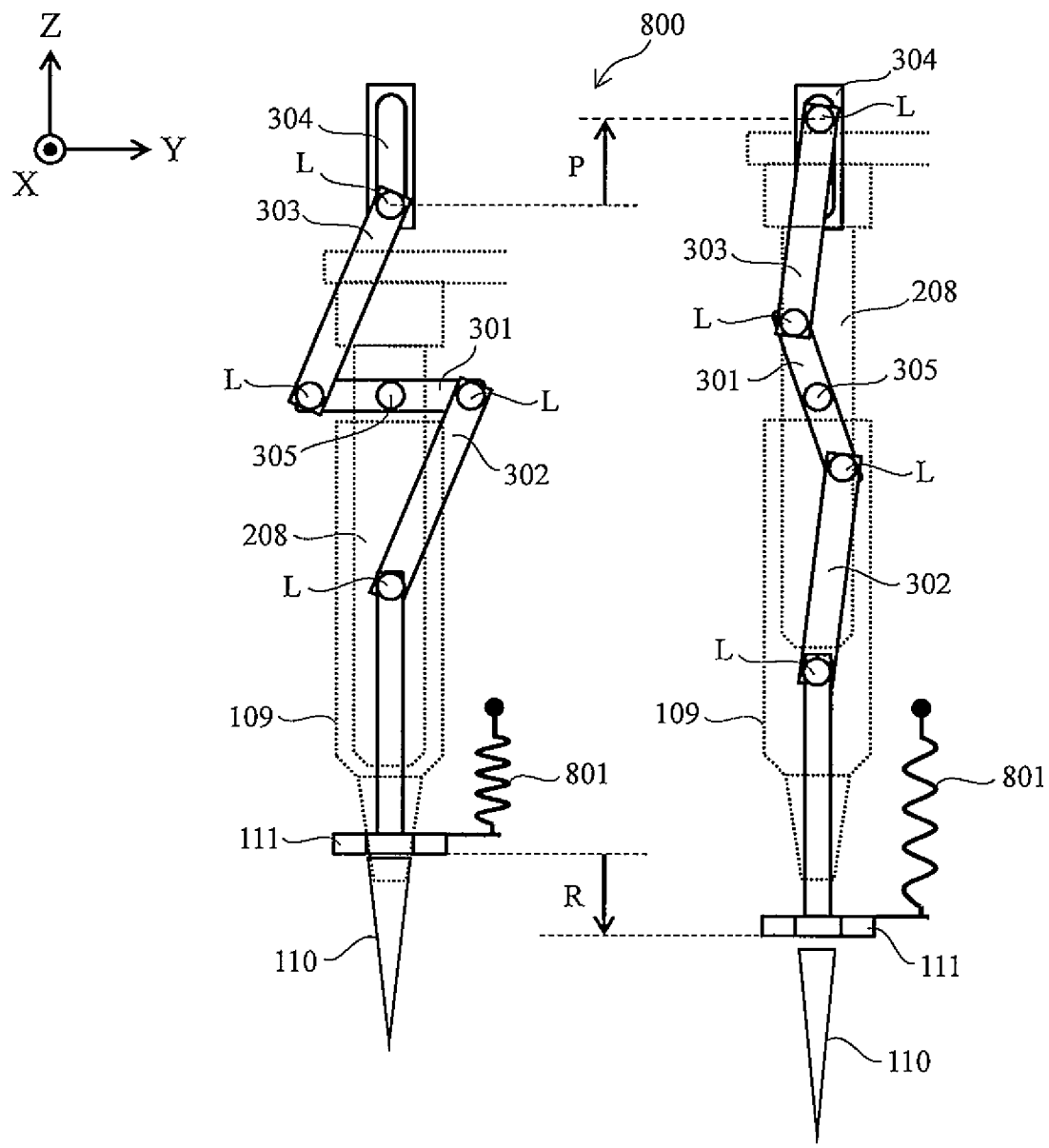
FIG. 10 is a diagram for describing a dispensing device of a fourth embodiment.

FIG. 10 is a diagram for describing a dispensing device of a fourth embodiment. In FIG. 10, only the component 800 for detaching the disposable tip 110 is illustrated in order to describe the differences from the first embodiment. The dispensing device of the fourth embodiment is different from the dispensing device 300 of the first embodiment in that the upper end of the tip detachment part 111, the base 201, and a spring member 801 (for example, a spring) are connected. The spring member 801 normally biases the tip detachment part 111 in the direction of arrow R illustrated in FIG. 10. Since the tip detachment part 111 is biased downward in the vertical direction by the spring member 801, the rod 303 can be lifted upward with less force as compared with the case where the spring member 801 is not present. That is, the driving force for operating the piston 208 to detach the disposable tip 110 can be reduced, and the driving components such as the motor can be downsized. In addition, in FIG. 8, when the position of the rotation center of the rod 301 satisfies H1<H2, the working distance of the rod 303 can be reduced by utilizing the lever ratio, but a large driving force is required. The spring member 801 can be effectively used even in such a case.

Further, the disclosure is not limited to the above embodiments, but various modifications may be contained. For example, the above-described embodiments of the disclosure have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment.

REFERENCE SIGNS LIST

300 dispensing device
101 base
102 motor
103 coupling
104 screw shaft
105 nut
106 slider
107 linear guide
108 piston
109 piston receiving part
110 disposable tip
111 tip detachment part
301 to 303 rod
304 rail
305 rotation center
501 tip holder
601 to 603 rod
604 rail
605 rotation center
701, 703 rack
702 gear
704 upper end
705 rotation center
801 spring member All publications, patents, and patent applications cited in the present specification should be hereby incorporated by reference in their entirety.

The invention claimed is:

1. A dispensing device for sucking a liquid sample into a disposable tip and discharging the sucked liquid sample, comprising:
   a piston;
   a piston receiving part into which the piston is inserted;
   a tip detachment part that detaches the disposable tip mounted on an edge of the piston receiving part by pressing down the disposable tip;
   a force action part that is in conjunction with the tip detachment part and moves in a direction opposite to a movement direction of the tip detachment part; and
   a first motor that drives the piston;
   wherein the force action part moves in contact with the piston when the piston is pulled; and
   wherein each of the tip detachment part and the force action part is rotatably attached to a same rotating body.

2. The dispensing device according to claim 1, wherein the tip detachment part and the force action part are interlocked by a lever structure.

3. The dispensing device according to claim 2, wherein each of the tip detachment part and the force action part is foldable.

4. The dispensing device according to claim 3, wherein a position of a fulcrum of the lever structure is a position where a moving distance of the tip detachment part is longer than a moving distance of the force action part.

5. The dispensing device according to claim 1, wherein the tip detachment part and the force action part form a structure having a rotating shaft.

6. The dispensing device according to claim 1, wherein the tip detachment part includes an elastic body that biases the tip detachment part in a direction of pressing out the disposable tip.

* * * * *